Jan. 26, 1932.   O. R. BRINEY   1,842,579
MACHINING DEVICE
Filed June 21, 1928   2 Sheets-Sheet 1

INVENTOR
O. R. Briney
BY
C. F. Henkel.
ATTORNEY

Jan. 26, 1932.  O. R. BRINEY  1,842,579
MACHINING DEVICE
Filed June 21, 1928    2 Sheets-Sheet 2
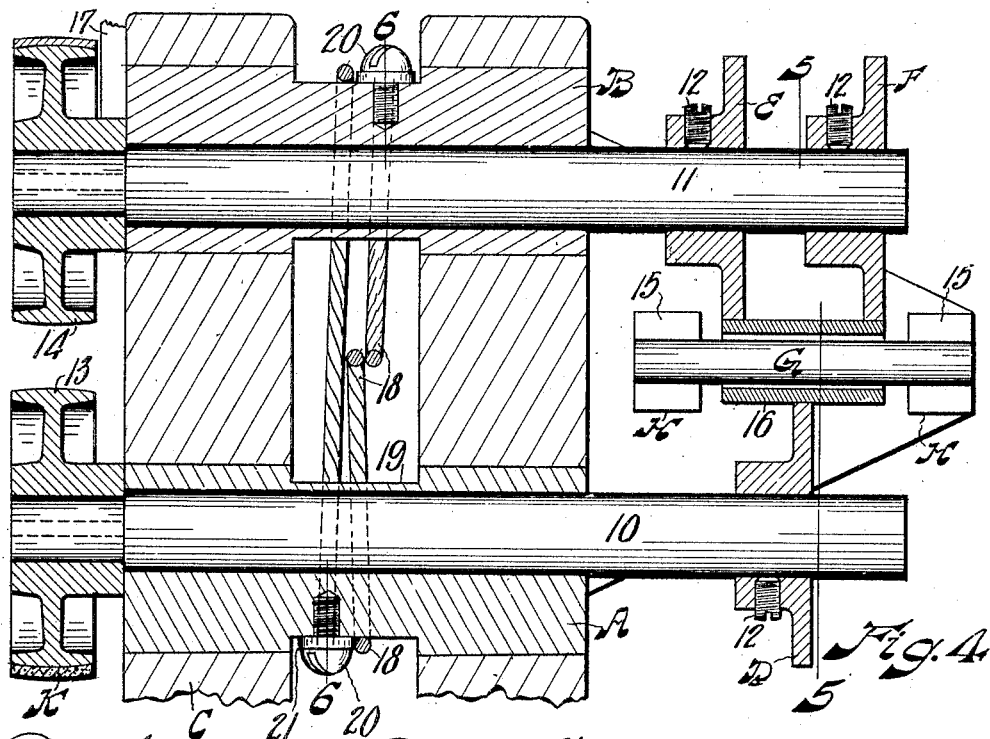
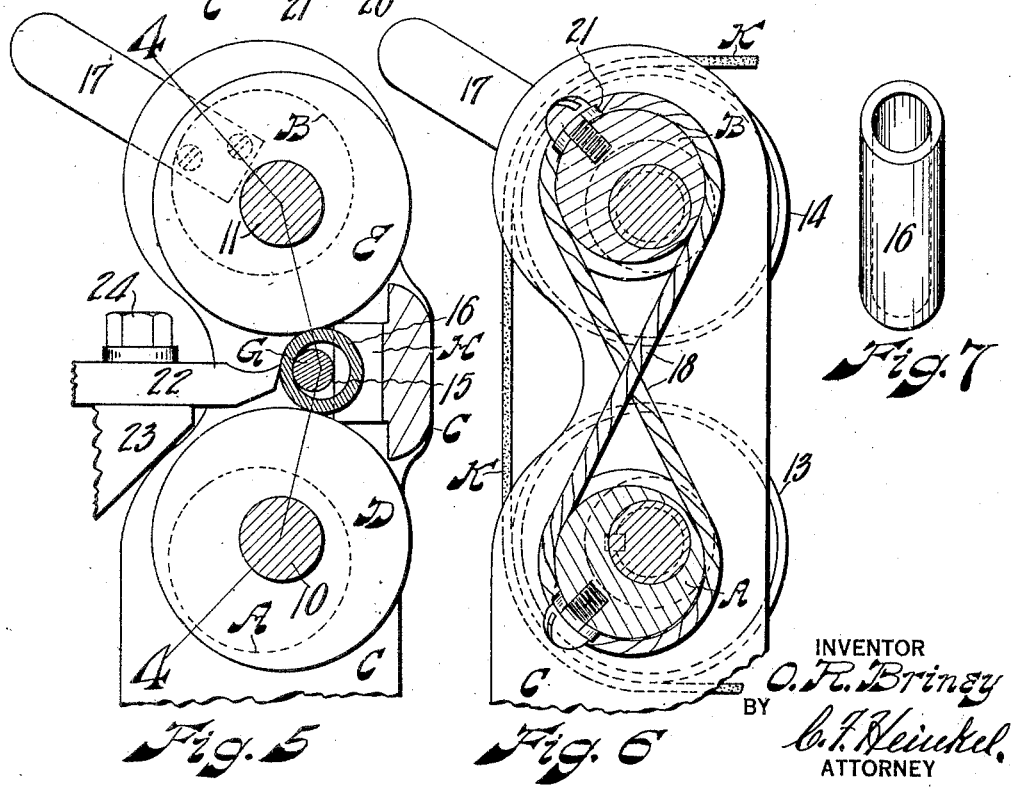
INVENTOR
O. R. Briney
BY
C. F. Heinkel
ATTORNEY Patented Jan. 26, 1932

1,842,579

UNITED STATES PATENT OFFICE

OTTIS R. BRINEY, OF PONTIAC, MICHIGAN

MACHINING DEVICE

Application filed June 21, 1928. Serial No. 287,268.

My invention relates to machining generally and more particularly to devices for trueing up surface of articles and still more particularly to devices for machining exterior surface true with interior surface of tubular articles.

Objects of my invention are to provide a simple, inexpensive, efficient, and easily operable means for machining articles; for trueable means for machining articles; for trueing up articles; and for machining exterior surface true with interior surface of tubular articles. Other objects will be pointed out, or will become apparent or obvious, or will suggest themselves in the herein following description of my invention and from an inspection of the accompanying drawings.

In many instances it is necessary or at least quite desirable that one surface of an article be machined true with other surface of the same article. In bushings, or similar articles, the outer circumferential surface should be true with the inner circumferential surface as is well known in the art.

Applicant has found that a device such as a chuck or collet which grips such articles is very rarely true and does not remain true and distorts the article out of its natural condition while it is being so held and the article resumes its natural condition after it is released from such a device and therefore also distorts the surface which has been machined while it was so held and therefore the two surfaces are not true with each other.

Applicant has also found that a device such as an arbor with centers distorts the articles out of their natural condition when driven thereon and has also found that the centers are rarely true and do not remain true and therefore can not be depended upon to produce one surface true with the other. Furthermore, when the article is distorted by the arbor and a cut is taken off of the outside while the same is so distorted, the article will resume its original or natural form or condition when the arbor is removed from the same and, therefore, the two surfaces can not be true with each other.

Applicant has also found that a tubular article can be machined on outer surface while the same is guided on inner surface thereof by means of an arbor like member or means which extends through the article and is abutted sidewise on an abutment and which arbor is not supported on centers or equivalent means nor in nor on chucks or equivalent means and rotating the article against one side of this arbor like means and that the outer surface so machined will always be absolutely true with inner surface irrespective of how much the arbor or the abutment thereof wears and that the article always remains in its natural conditions and is not distorted in any manner during the entire machining operation.

Applicant has also found that when an arbor like member is held against moving away from inner surface of an article but is permitted to have some sidewise movement, angular with the line of holding the member, preferably resting the arbor on flat surface, a sort of floating movement in line with the flat surface, the outer surface will be machined more true with the inner surface than when the member is confined in a V block or equivalent means.

Applicant has illustrated in the accompanying drawings one certain device embodying his invention although he is fully aware that his invention can be embodied in other devices.

In the accompanying drawings:—

Fig. 4 is a longitudinal section taken in a substantially vertical plane indicated by the line 4—4 in Fig. 5 and shows the relations between the members more clearly in that plane.

Fig. 5 is a transverse section taken in a vertical plane indicated by the line 5—5 in Fig. 4 and shows the relations between the bushing and the rollers and the guide and abutment means more clearly in that plane.

Fig. 6 is a transverse section taken in a vertical plane indicated by the line 6—6 in Fig. 4 and shows the relations between the plugs and the rotating means therefor more clearly.

Fig. 7 is a perspective view of the bushing shown as held in the devices shown.

Similar reference characters refer to similar parts throughout the views.

Figure 1:
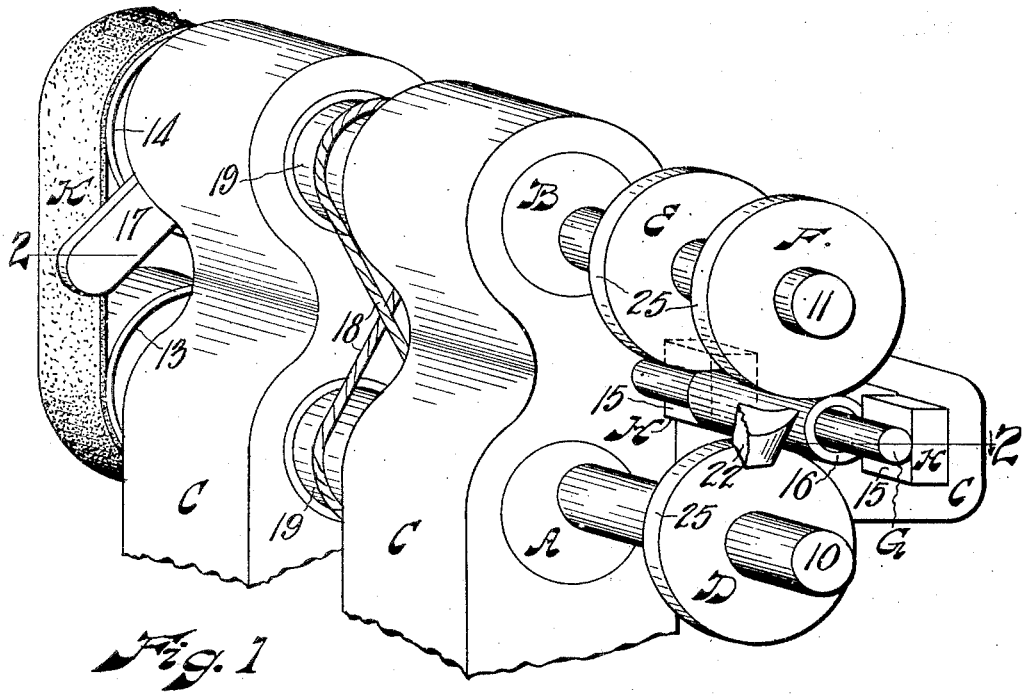
Fig. 1 is a general perspective view of a machining device for machining the outer surface of bushings embodying my invention.
Figure 2:
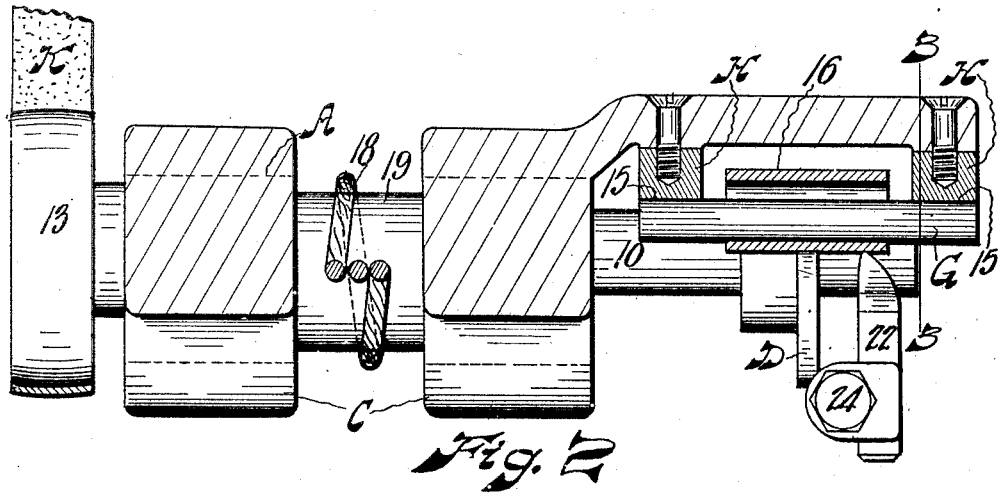
Fig. 2 is a longitudinal section taken in a horizontal plane indicated by the line 2—2 in Fig. 1 and shows relations of the bushing and guide means and abutment more clearly in that plane.

The spindle moving means is shown as comprising two laterally spaced plugs A and B, cylindrically straight and parallel with each other in the present instance, and rotatable in the bifurcated housing C the bottom portion of which can be formed to suit another machine or to comprise a base for the mechanism shown.

The bushing confining or positioning means is shown as comprising the rollers D and E and F, the arbor like member G and the abutment blocks H.

The roller D is mounted on the spindle 10 which is journaled in the plug A; the longitudinal axis of the spindle is eccentric with the longitudinal axis of the plug A and parallel therewith in the present instance.

The rollers E and F are mounted on the spindle 11 which is journaled in the plug B; the longitudinal axis of the spindle 11 is eccentric with the longitudinal axis of the plug B and parallel therewith in the present instance.

The eccentricity of both spindles as well as the angular relation of the axes thereof to or with the axis of the bushings are alike or symmetrical so that hereinafter described rotation of the plugs moves the spindles and the rollers thereon substantially in unison toward and away from the bushing.

Each of the rollers is slidable longitudinally on the shaft thereof so that the same can be adjusted for different lengths of bushings or for different spacing of the roller on one shaft and the rollers on the other or vice versa. Each roller has a hub with the set screw 12 threaded therein to fasten the rollers to the shaft thereof in adjusted position and to rotate the rollers with the shafts.

The driving or rotating means for the spindles is shown as comprising the pulley 13 secured to the rear end of the shaft 10 and the pulley 14 secured to the rear end of the shaft 11 in belt alignment with the pulley 13 and the belt 14 contacting both of the pulleys. The belt can be operated by any suitable means not shown in the drawings.

The abutment means for the member G is shown as two spaced blocks H mounted on the housing, each having the flat or level or even surface 15, and both surfaces in one plane in the present instance.

The guide means for the bushing is shown as a plain cylindrical arbor G extending entirely through the bushing 16, of a diameter smaller than the bore in the bushing, and each end of the arbor rests against one of the surfaces 15 of the blocks H.

The handle 17 is fastened to the rear end of the plug B for the purpose of rotating the plugs in their journals in the housing.

The means for rotating the plugs in unison when rotative moving force is applied to either one of the plugs is shown as a flexible round belt 18 wound alternately over both plugs and one end of the belt fastened to one of the plugs and the other end fastened to the other plug.

Each plug is shown with the circumferential groove 19 and the screw 20 threaded into the plug within the groove. The ends of the belt 18 have the clips 21 fixed thereon and are held firmly against the bottoms of the grooves by means of the screws 20 so that a rotation of either one of the plugs creates a pull on the belt and thereby rotates the other plug.

The machining tool means is shown as the lathe tool 22 supported on the rest 23 and held in position by means of the screw 24. A grinding wheel or other means can be used in place of the lathe tool shown.

As to the operation of the device shown and described:—

In the drawings, the members are shown as being in operating position and I will describe the operation as starting from that position.

Figure 3:
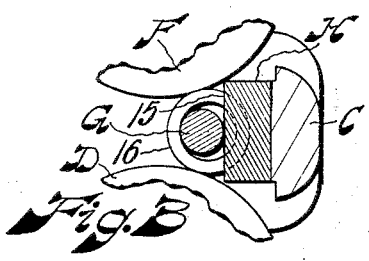
Fig. 3 is a sectional view showing the transverse relation between the bushing and guide and abutment means more clearly in that plane; the section being taken in a vertical plane indicated by the line 3—3 in Fig. 2.

As is observed, the outer circumferential surfaces 25 of the rollers D, E, and F contact to outer circumferential surface of the bushing at one side as clearly seen in Figs. 3 or 5. In the present instance, the tension of the belt 14 tends to rotate the plugs and thereby moves the spindles and the rollers thereon laterally toward each other and toward the bushing and thereby moves the bushing laterally against one side of the arbor and moves the arbor laterally against the surfaces 15.

The movement of the belt 14 rotates the spindles and the rollers thereon and the rollers rotate the bushing against one side of the arbor.

While the bushing is so rotated with the inner surface thereof in contact with only one side of the arbor, the lathe tool operates ers rotate the bushing against one side of the arbor.

Since the fixed surfaces 15 retain the arbor in position sidewise in one direction and since the rollers hold and rotate the bushing sidewise in the same direction against the positionally fixed arbor, the outer surface of the bushing will be machined absolutely true with the inner surface of the same bushing by the tool means without the use or necessity of any centers or chucks or other similar or equivalent means and will machine these surfaces true with each other irrespective of how the arbor wears.

When the machining operation is completed, the plug B is rotated in one direction by means of the handle 17 whereby the plug A is also rotated by means of the belt 18 each end of which is fastened to one of the plugs so that the belt can not slip on the plugs.

When the plugs are so rotated, the spindles and the rollers thereon move laterally away from each other due to the eccentric mounting thereof and thereby also move away from the bushing and release the same from the arbor and thereby also release the arbor so that the bushing and the arbor can easily be taken out of the device without manipulating any other member thereof.

The arbor is then inserted into another bushing, either of the same external and internal diameter, or of the same external diameter and a different internal, or of the same internal diameter and a different external diameter, and the arbor with the bushing thereon can then be easily inserted into the device by temporarily holding the arbor against the surfaces 15 and then rotating the plug B, in a direction opposite the first mentioned direction, by means of the handle 17, whereby both plugs are rotated and the spindles and the rollers thereon move laterally toward the bushing and contact the outer surface thereof and move the same sidewise against one side of the arbor and thereby move the arbor sidewise against the surfaces 15 due to the longitudinal axis of the rollers being located ahead of the longitudinal axis of the bushing, and thereby holds the bushing in machining position and rotates the bushing against one side of the positionally fixed arbor due to the action of the belt 14.

The arbor does not fill the bore of the bushing completely and there is no limit to the amount of clearance between the bore in the bushing and the arbor; therefore, one size of arbor can be used for variously sized bores of bushings.

When the lengths of bushings vary greatly, or when any particular or general relation between the rollers or between the rollers and the bushings is desired, the set screws 12 can be loosened, the rollers moved longitudinally on the shafts into desired positions, and the set screws tightened and thereby retain the rollers in position on the spindles and cause the same to rotate with the spindles.

By using three rollers as shown, I attain what is commonly known as a three point suspension which prevents rocking of the bushing.

The surfaces 15 are flat and even and the arbor rests sidewise against these surfaces. The arbor is thereby held against movement sidewise or laterally in the direction toward these surfaces but is not held against movement sidewise or laterally at an angle to the direction just mentioned and can move laterally, up and down in the present instance, as distinguished from such devices as V blocks which confine the arbor against lateral movement.

After repeated tests, I have found that much more accurate work is produced when the arbor rests against a flat surface than when it rests in a V block or other similar or equivalent confining means.

Upon first sight it appears that a confined arbor should produce more accurate work and probably would do so in devices different from my device but in actual practice I have found that work produced with an arbor which is held against bodily movement in one lateral direction and permitted bodily lateral movement in other directions, a sort of floating arbor confined to float in one plane, as shown and described and claimed, produces more accurate work than an arbor which has no such floating possibility.

I am aware that my invention can be applied to devices other than the one shown and described and that changes and modifications can be made in the structure and in the arrangement of the elements shown and described within the scope of the appended claims; therefore, without limiting myself to the precise application of my invention as shown and described nor to the precise structure and arrangement of elements as shown and described,

I claim:—

1. A machining device for a tubular article including a laterally supported article guide means contactable on inner surface of said article and a rotatable article confining means contacting outer surface of said article and contacting said article onto said guide means and rotating the same for machining outer surface thereof.

2. A machining device for a tubular article including a laterally supported guide member extending through said article, a roller means acting on one side of said article to contact the same onto said guide member for location thereon and to rotate the same, and a tool means to operate on exterior surface of said article.

3. A machining device for a tubular article including a laterally supported guide member contacting inner surface of said article, a plurality of rotatable members contacting outer surface of said article to rotate the same and to contact the same onto said guide member for location thereon, and a tool means to operate on outer surface of said article.

4. A machining device for a tubular article including an abutment means having spaced flat abutment faces, a guide member extending through said article and resting against said abutment faces, said guide member being free to move sidewise on said faces, roller means acting on one side of said article to contact the same onto said guide member and to rotate the same, and a tool means to operate on exterior surface of said article.

5. A machining device for a tubular article including article machining means, an abutment means having flat surface, an article guide means extending longitudinally through said article and abutting laterally on said flat surface, and a rotatable roller means contacting said article on one side thereof and thereby rotating said article against one side of said guide means and contacting said guide means onto said flat surface.

6. A machining device for a tubular article including a housing, two plugs parallelly journaled in said housing, a spindle journaled in each of said plugs, the longitudinal axis of each of said spindles being eccentric and parallel with the longitudinal axis of the corresponding one of said plugs, a roller on one of said spindles and having a set screw to permit the roller to be adjusted longitudinally of said one spindle and to rotate therewith, a pair of rollers on the other one of said spindles each having a set screw to permit the same to be adjusted longitudinally of said other spindle and to rotate therewith, a pair of abutment blocks mounted on said housing, an article guide resting on said abutment blocks and extending through said article, said article being held in position between said article guide and said rollers, means for rotating spindles, a belt means alternately wound around both of said plugs, one end of said belt means fastened to one of said plugs, and the other end of said belt means fastened to the other one of said plugs so that the rotation of either one of said plugs rotates both of said plugs in unison and in opposite directions.

7. A machining device including two spindles, article machining means, a roller on one of said spindles to contact articles, two rollers on the other one of said spindles to contact said articles, each of said rollers being movable longitudinally on said spindles to adjust the same to various lengths of articles and to various relations between each other, and means for fastening said rollers to said spindles in adjusted positions.

8. A machining device including article machining means and two rotatable plugs, article contacting spindle means eccentrically journaled in said plugs, and a belt means wound alternately around both of said plugs and having one end thereof fastened to one of said plugs and the other end thereof fastened to the other one of said plugs to rotate both of said plugs in unison when either one of said plugs is rotated.

9. A machining device including a housing, two plugs journaled in said housing, a spindle eccentrically journaled in each one of said plugs, rollers on said spindles to contact and to rotate articles to be machined, and a belt means wound alternately around both of said plugs and having one end thereof fastened to one of said plugs and the other end thereof fastened to the other one of said plugs to rotate both of said plugs in unison when either one of said plugs is rotated and thereby move said spindles and rollers thereon toward and away from each other and toward and away from said articles.

10. A machining device for tubular articles including a housing, flat abutment surface on said housing, an article guide member extendible longitudinally through said articles and abuttable laterally on said surface, two plugs journaled in said housing, a spindle eccentrically journaled in each one of said plugs, rollers on said spindles to contact and to rotate articles to be machined, a belt means wound alternately around both of said plugs and having one end thereof fastened to one of said plugs and the other end thereof fastened to the other one of said plugs to rotate both of said plugs in unison when either one of said plugs is rotated and thereby move said spindles and rollers thereon toward and away from each other and toward and away from said articles, and move said guide member against said surface.

11. A machining device for a tubular article including a housing, article machining means, two plugs journaled in said housing, a spindle eccentrically journaled in each of said plugs, rollers on said spindles and all rollers contacting outer surface of said article on one side thereof, abutment means contacting inner surface of said article in opposition to said rollers, a pulley on each of said spindles, and a belt means over both of said pulleys and adapted to rotate said spindles in the same direction.

12. A machining device for tubular articles including an article guide means contactable on inner surface of said articles and an article positioning means contactable on outer surface of said articles to locate the same against one side of said guide means for location of said article in the device.

13. A machining device for tubular articles including article machining means, a housing having abutment surface, an article guide member contactable on said surface and on inner surface of said articles, and an article positioning means contactable on outer surface of said articles to locate the same against one side of said guide member and to locate said guide member against said surface for location of said article in the device.

14. A machining device for a tubular article including an article rotating means for machining thereof and an article positioning means including an article guide means extending longitudinally through said article and an abutment means to confine said guide means laterally in one direction and leaving the same free to move laterally in other directions for locating said article in the device.

15. A machining device for a tubular article including an article guide means extending longitudinally through said article, an abutment means to confine said guide means laterally in one direction and leaving the same free to move laterally in other directions, and a rotating article positioning means contacting said article onto said guide means in said one direction for locating said article in the device and to rotate the same for machining thereof.

16. A machining device for a tubular article including an abutment means having flat surface, an article guide means extending longitudinally through said article and abutting laterally on said flat surface, and a rotating positioning means to rotate said article for machining thereon and to locate the same sidewise on said guide means and said guide means sidewise on said flat surface for location of said article in the device.

17. A machining device for bushings including a locating means for bushings comprising a guide member smaller in diameter than the bore in a bushing extending through the bore and rotating rollers positionally movable for locating and for releasing the bushing and said guide member and to rotate the bushing upon contact thereof on the bushing, and a tool means to operate on outer surface of the bushing.

18. A machining device for bushings including a locating means for bushings comprising a guide member smaller in diameter than the bore in a bushing extending through the bore and rotating rollers positionally movable for locating and for releasing the bushing and said guide member and to rotate the bushing upon contact thereof on the bushing, said rollers being staggered longitudinally and transversely of the bushing, and a tool means to operate on outer surface of the bushing.

In testimony of the foregoing I affix my signature.

OTTIS R. BRINEY.